United States Patent
Hwang

(10) Patent No.: US 9,891,322 B2
(45) Date of Patent: Feb. 13, 2018

(54) GPS ARRIVAL ANGLE SELECTING SYSTEM AND METHOD

(71) Applicant: INDUSTRY-ACADEMIC COOPERATION FOUNDATION, CHOSUN UNIVERSITY, Gwangju (KR)

(72) Inventor: Suk-Seung Hwang, Gwangju (KR)

(73) Assignee: Industry-Academic Cooperation Foundation, Chosun University (FR)

( * ) Notice: Subject to any disclaimer, the term of this patent is extended or adjusted under 35 U.S.C. 154(b) by 0 days.

(21) Appl. No.: 14/002,345

(22) PCT Filed: Nov. 7, 2012

(86) PCT No.: PCT/KR2012/009313
§ 371 (c)(1),
(2) Date: Aug. 29, 2013

(87) PCT Pub. No.: WO2014/061854
PCT Pub. Date: Apr. 24, 2014

(65) Prior Publication Data
US 2015/0212210 A1    Jul. 30, 2015

(30) Foreign Application Priority Data
Oct. 17, 2012   (KR) .......................... 10-2012-0115596

(51) Int. Cl.
*G01S 19/24* (2010.01)
*G01S 19/21* (2010.01)
(Continued)

(52) U.S. Cl.
CPC ................. *G01S 19/24* (2013.01); *G01S 3/14* (2013.01); *G01S 3/74* (2013.01); *G01S 19/21* (2013.01)

(58) Field of Classification Search
CPC .......... G01S 19/24; G01S 13/14; G01S 13/74; G01S 19/21
(Continued)

(56) References Cited

U.S. PATENT DOCUMENTS 5,241,313 A * 8/1993 Shaw .................. G01S 13/9035
342/13
5,786,791 A * 7/1998 Bruckert .................. G01S 5/04
342/457
(Continued)

FOREIGN PATENT DOCUMENTS

KR    10-20060092046    9/2006

OTHER PUBLICATIONS

Machine Translation of Hwang, "GPS AOA Choosing Algorithm in Environment of High-Power Interference Signals", Dept. of Mechatronics Enginnering, Chosun University, Jul. 16, 2012.*
(Continued)

*Primary Examiner* — Frank J McGue
(74) *Attorney, Agent, or Firm* — JHK Law; Joseph Hyosuk Kim

(57) ABSTRACT

Disclosed is a GPS arrival angle selecting system. The system includes: a arrival angle estimating unit connected to a receiving antenna of a GPS receiver including at least one antenna array element and configured to decide a first arrival angle of a signal received prior to despreading and a second arrival angle of a signal received after despreading; and an arrival angle selecting unit configured to select a different peak value by comparing the first arrival angle and the second arrival angle. Also disclosed is a GPS arrival angle selecting method.

10 Claims, 6 Drawing Sheets

(51) Int. Cl.
*G01S 3/74* (2006.01)
*G01S 3/14* (2006.01)

(58) Field of Classification Search
USPC .................................................. 342/357.51
See application file for complete search history.

(56) References Cited

U.S. PATENT DOCUMENTS

| | | | | |
|---|---|---|---|---|
| 5,945,948 A * | 8/1999 | Buford | ................... | G01S 5/021 |
| | | | | 342/457 |
| 2002/0150065 A1* | 10/2002 | Ponnekanti | .......... | H04B 7/0617 |
| | | | | 370/334 |
| 2003/0012265 A1* | 1/2003 | Lin | ........................ | H04B 7/086 |
| | | | | 375/148 |
| 2009/0092175 A1* | 4/2009 | Oura | ................... | H04B 1/7113 |
| | | | | 375/148 |

OTHER PUBLICATIONS

Hwang et al., "Mulitcomponent Receiver Architectures for GPS Interference Suppression", IEEE Transactions on Aerospace and Electronic Systems, vol. 42, No. 2, Apr. 2006.*
Hwang, "AOA choosing Algorithm for GPS Adaptive Array," Dept. of Mechatronics Engineering, Chosun University, English Abstract.
Hwang, "GPS AOA Choosing Algorithm in Environment of High-Power Interference Signals," Department of Mechatronics Engineering, Chosun University, Jul. 16, 2012.
Kim, "Sub-Array based Adaptive Beamforming Technique for GPS Receiver," Dept of Avionics Engineering, Graduate School of Korea Aerospace University, Feb. 2011, English summary.

* cited by examiner

[Fig. 1]
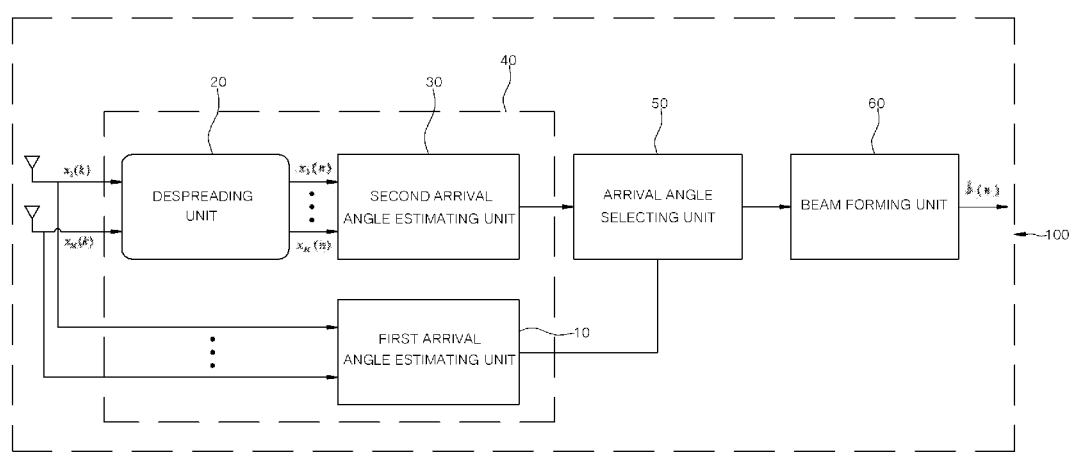
[Fig. 2]
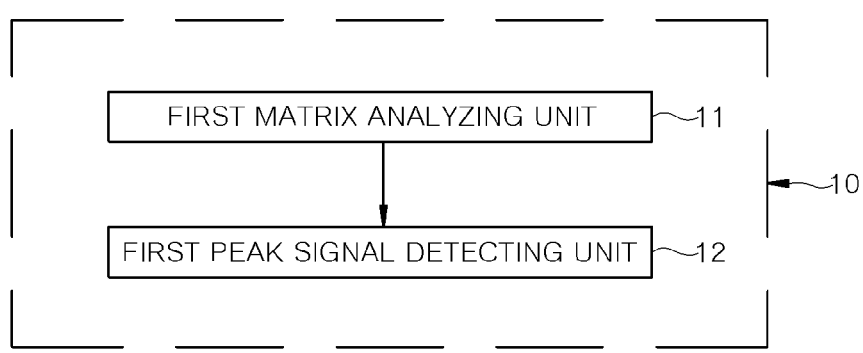

[Fig. 3]
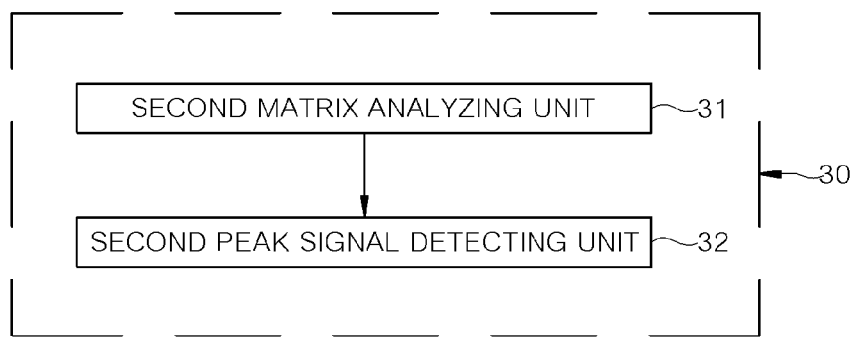
[Fig. 4]
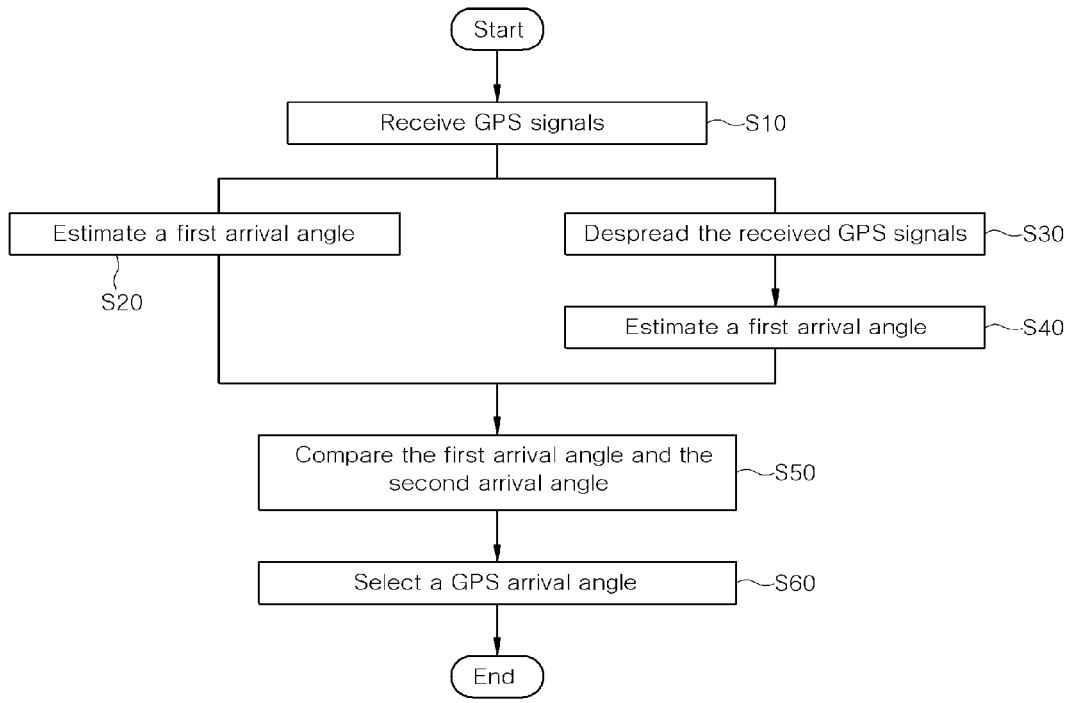

[Fig. 5]
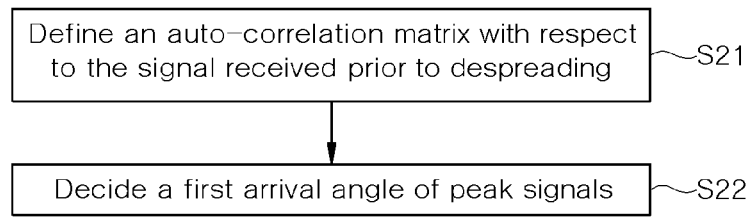
[Fig. 6]
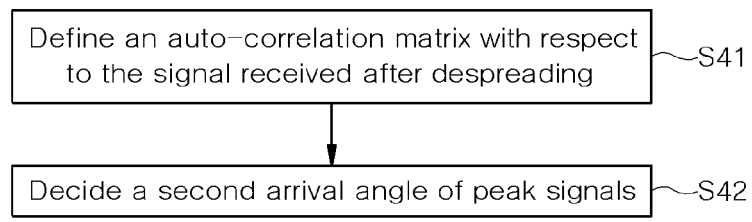

[Fig. 7]
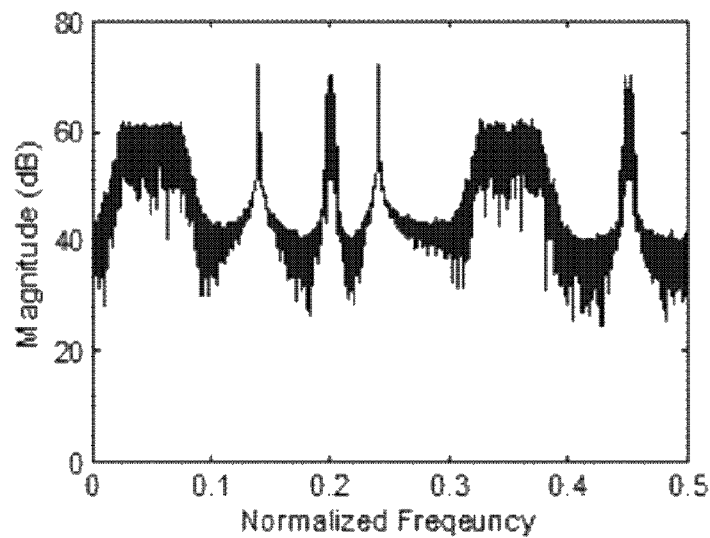
[Fig. 8]
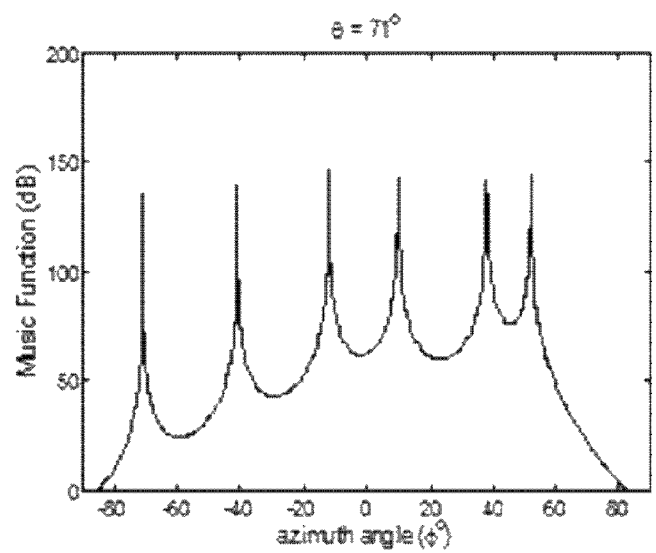

[Fig. 9]
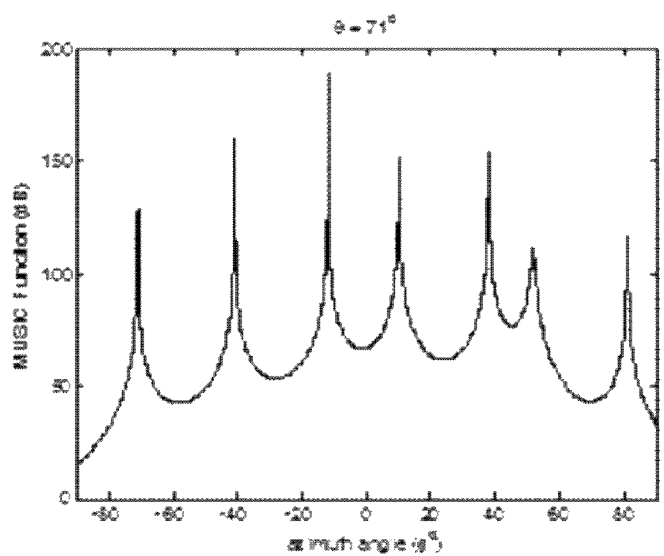
[Fig. 10]
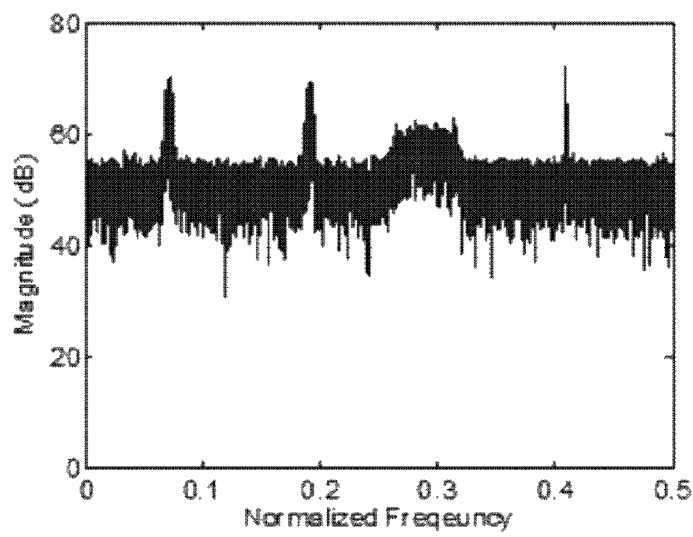

[Fig. 11]
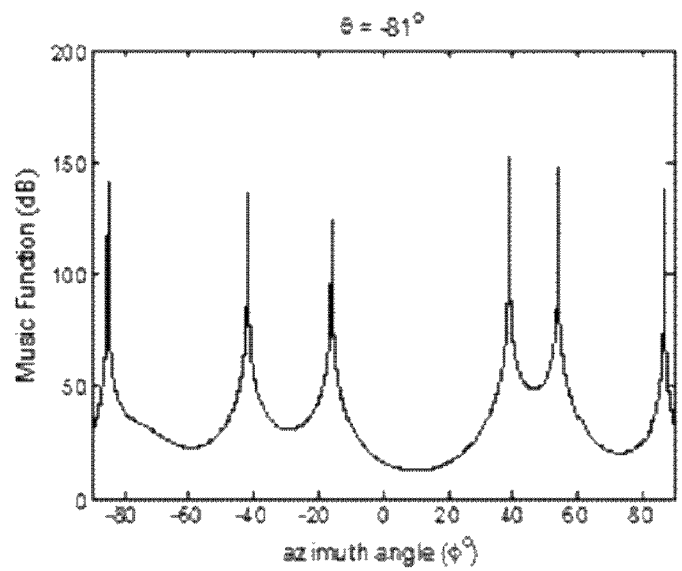
[Fig. 12]
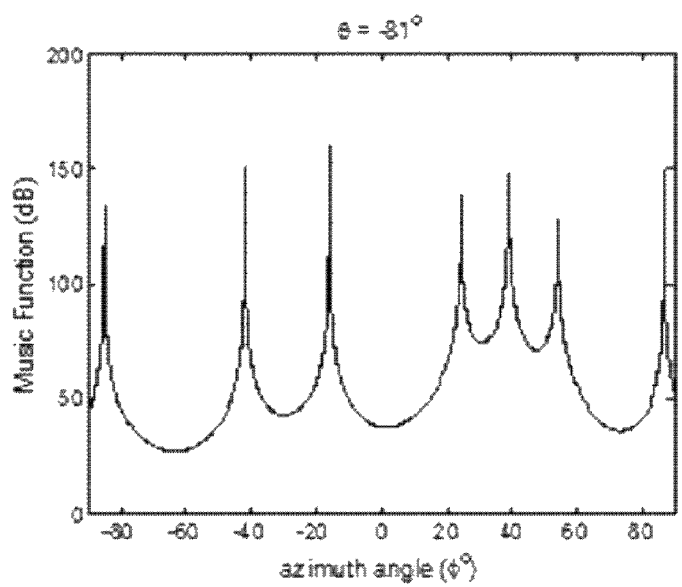

GPS ARRIVAL ANGLE SELECTING SYSTEM AND METHOD

FIELD OF THE INVENTION

The present invention relates to a technology for estimating an arrival angle of a GPS (Global Positioning System) designed to determine the position of a person or an object and, more particularly, to a GPS arrival angle selecting system and method capable of selecting an arrival angle of an accurate GPS signal by comparing a pre-despreading arrival angle with a post-despreading arrival angle.

BACKGROUND ART

In general, a GPS satellite utilizing a low-power direct-sequence spread spectrum (DSSS) signal transmits two types of signals, namely an L1 signal having a carrier frequency of 1574.42 MHz and an L2 signal having a carrier frequency of 1227.60 MHz. A modernized GPS additionally utilizes two commercialized signals, namely an L2c signal having a carrier frequency of 1227.60 MHz and an L5 signal having a carrier frequency of 1176.45 MHz.

Most beam formers for a GPS antenna employing conventional multiple antenna elements require accurate GPS arrival angle information in order to effectively receive a GPS signal. Since the electric power of a GPS signal is far lower than the high noise power level and the high interference signal electric power, it is quite difficult to estimate accurate GPS arrival angle information.

For the purpose of estimating a GPS arrival angle, there have been used different arrival angle estimation algorithms such as the Multiple Signal Classification (MUSIC) (referred to as "prior art 1" for the sake of convenience) and the Estimation of Signal Parameter via Rotational Invariance Techniques (ESPRIT) (referred to as "prior art 2" for the sake of convenience).

While the conventional arrival angle estimation algorithms are superior in arrival angle estimation performance, they have serious problems in estimating a GPS arrival angle. More specifically, prior to despreading, the GPS electric power remains far lower than the interference or noise power level. This makes it impossible to estimate the GPS arrival angle. If an arrival angle is estimated after despreading, the estimated arrival angle includes both a GPS arrival angle and an interference arrival angle.

SUMMARY OF THE INVENTION

In view of the aforementioned problems inherent in the prior art, it is an object of the present invention to provide a GPS arrival angle selecting system capable of selecting an arrival angle of an accurate GPS signal by comparing arrival angles estimated by signals before and after despreading.

Another of the present invention to provide a GPS arrival angle selecting method capable of selecting a different peak value among estimated peak values by comparing first and second arrival angles estimated by signals before and after despreading.

According to one aspect of the present invention, there is provided a GPS arrival angle selecting system, including: a arrival angle estimating unit connected to a receiving antenna of a GPS receiver including at least one antenna array element and configured to decide a first arrival angle of a signal received prior to despreading and a second arrival angle of a signal received after despreading; and an arrival angle selecting unit configured to select a different peak value by comparing the first arrival angle and the second arrival angle.

According to another aspect of the present invention, there is provided a GPS arrival angle selecting method, including the steps of: (a) if a GPS receiver including at least one antenna array element receives GPS signals, deciding a first arrival angle of peak signals among the GPS signals received prior to despreading through the use of a first arrival angle estimating unit; (b) deciding a second arrival angle of peak signals among the GPS signals received after despreading through the use of a despreading unit and a second arrival angle estimating unit; and (c) selecting a different peak value among estimated peak values through the use of an arrival angle selecting unit by comparing the first arrival angle and the second arrival angle.

The GPS arrival angle selecting system according to the present invention can select an arrival angle of an accurate GPS signal by comparing arrival angles estimated by signals before and after despreading. Moreover, it is possible to enhance the performance of a GPS receiver under a high-power interference environment.

The GPS arrival angle selecting method according to the present invention can select, among post-despreading estimated peak values, a GPS arrival angle differing from a pre-despreading estimated peak value.

BRIEF DESCRIPTION OF THE DRAWINGS

FIG. 1 is a block diagram showing the overall configuration of a GPS arrival angle selecting system according to the present invention.

FIG. 2 is a configuration view showing the detailed configuration of a first arrival angle estimating unit employed in the GPS arrival angle selecting system according to the present invention.

FIG. 3 is a configuration view showing the detailed configuration of a second arrival angle estimating unit employed in the GPS arrival angle selecting system according to the present invention.

FIG. 4 is a flowchart illustrating the overall flow of a GPS arrival angle selecting method according to the present invention.

FIG. 5 is a flowchart illustrating the detailed flow of step S20 in the GPS arrival angle selecting method according to the present invention.

FIG. 6 is a flowchart illustrating the detailed flow of step S40 in the GPS arrival angle selecting method according to the present invention.

FIGS. 7 through 9 are graphs representing a first test example in the GPS arrival angle selecting method according to the present invention.

FIGS. 10 through 12 are graphs representing a second test example in the GPS arrival angle selecting method according to the present invention.

DETAILED DESCRIPTION OF THE PREFERRED EMBODIMENTS

Certain preferred embodiments of a GPS arrival angle selecting system and method according to the present invention will now be described in detail with reference to the accompanying drawings.

FIG. 1 is a block diagram showing the overall configuration of a GPS arrival angle selecting system 100 according to the present invention. The GPS arrival angle selecting system 100 includes an arrival angle estimating unit 40, an arrival angle selecting unit 50 and a beam forming unit 60.

The GPS arrival angle selecting system 100 takes into account the arrival angle selection with respect to the C/A (Coarse Acquisition). In a GPS receiver including M antenna array elements, the received signal vector (magnitude M) at sample index k is given by equation 1:

$$x(k)=a_c c_i(k)b(k)+As(k)+v(k),$$

where i denotes a satellite index, and other variables are summarized in Table 1 below.

TABLE 1

| Symbols | Definition |
|---|---|
| $a_c$ | Array response vector (magnitude M) to a GPS signal |
| $c_i(k)$ | Cyclostationary PRN code element to i-th satellite (Length N = 20 × 30) |
| b(k) | GPS data bit for maintaining a constant during one cycle of an PRN code |
| A | M × L array response matrix |
| L | Number of interference signals |
| s(k) | Vector (magnitude L) of interference signals |
| v(k) | AWGN (Additive White Gaussian Noise) vector (magnitude M) having an independent identically-distributed characteristic of an average 0 and a dispersion $\sigma^2$ |

In the present invention, it is assumed that the GPS receiver employs a lattice antenna array structure having a magnitude M of P×Q (M=PQ). The ith column of the array response vector of equation 1 supra is given by equation 2:

$$a_l = \begin{bmatrix} 1 \\ e^{-j\zeta_l} \\ \vdots \\ e^{-j(Q-1)\zeta_l} \\ e^{-j\eta_l} \\ e^{-j(\zeta_l+\eta_l)} \\ \vdots \\ e^{-j((Q-1)\zeta_l+(P-1)\eta_l)} \end{bmatrix},$$

where $\zeta_l$ is given by equation 3:

$$\zeta_l = \pi \sin \theta_l \cos \varphi_l,$$

and $\eta_l$ is given by equation 4:

$$\eta_l = \pi \sin \theta_l \sin \varphi_l.$$

In equations 3 and 4, $\theta_l$ denotes an elevation angle with respect to an l-th signal and $\Phi_l$ indicates an azimuth angle with respect to an l-th signal. It is also assumed that the period of sampled CM (Constant Modulus) interference signals is equal to the period of GPS PRN (Pseudorandom noise) codes.

The arrival angle estimating unit 40 is connected to a signal receiving antenna and is configured to estimate a first arrival angle of a signal received prior to despreading and a second arrival angle of a signal received after despreading. The arrival angle estimating unit 40 includes a first arrival angle estimating unit 10, a despreading unit 20 and a second arrival angle estimating unit 30.

The first arrival angle estimating unit 10 is connected to the signal receiving antenna and is configured to analyze the signal received prior to despreading through the use of an auto-correlation matrix, thereby deciding a first arrival angle of peak signals. As shown in FIG. 2, the first arrival angle estimating unit 10 includes a first matrix analyzing unit 11 and a first peak signal detecting unit 12.

The first matrix analyzing unit 11 serves to decide the eigenstructure of an auto-correlation matrix of the signal received prior to despreading, which is given by equation 5:

$$R_x \Gamma = \Gamma \Lambda,$$

where Rx denotes an auto-correlation matrix, $\Lambda$ denotes a diagonal matrix represented by an equation: $\Lambda = \text{diag}\{\lambda_2, \ldots, \lambda_N\}$ in which $\{\lambda 1\}$ is an eigenvalue, and $\Gamma$ denotes a eigenvector matrix.

In equation 5 supra, the auto-correlation matrix Rx is defined by equation 6:

$$R_x = E[x(k)x^H(k)].$$

The first peak signal detecting unit 12 serves to detect an arrival angle of peak signals pursuant to the auto-correlation matrix decided in the first matrix analyzing unit 11. A function for estimating a first arrival angle of received signals on the basis of equation 5 can be represented by equation 7:

$$P_M(\theta, \phi) = \frac{1}{a^H(\theta, \phi)\Gamma_{M-L}\Gamma_{M-L}^H a(\theta, \phi)},$$

where $\Gamma_{M-L}$ denotes an M×(M−L) matrix composed of the columns including M−L eigenvectors equivalent to M−L smallest eigenvalues. The first arrival angle of received signals is decided by L largest peaks of $P_M(\theta, \Phi)$.

In the present invention, the signals received prior to despreading include a GPS signal, an interference signal and a noise. Since the electric power of the GPS signal is significantly lower than the noise power level, the GPS signal is included in a noise subspace and is not included in the estimated first arrival angle values.

However, the first arrival angle information estimated through the first arrival angle estimating unit 10 is compared with the second arrival angle information estimated from the signals received after despreading and, therefore, can be used in selecting the arrival angle information of the GPS signal.

The despreading unit 20 is connected to a signal receiving antenna and is configured to increase the electric power of the GPS signal to the interference power level or more.

In general, the PRN codes of a GPS are composed of twenty identical C/A codes specific to individual satellites. The PRN code with respect to the ith satellite is defined by equation 8:

$$c_i = [ca_i, \ldots, ca_i]^T,$$

where $ca_i$ denotes a C/A code column vector with respect to the ith satellite having a length of 1023.

In as much as $C_i^T C_i$ is equal to N (N=20×1023), the $C_i$-based despreading unit output is calculated by equation 9:

$$x(n) = a_c Nb(n) + As(n) + v(n),$$

where b(n)) denotes a GPS data bit, s(n) is represented by equation 10:

$$s(n) = S(n)c_i$$

in which S(n) is given by equation 11:

$$S(n) = [s(k), \ldots, s(k+N-1)],$$

and v(n) is represented by equation 12:

$$v(n) = V(n)c_i$$

in which V(n) is given by equation 13:

$$V(n)=[v(k), \ldots, v(k+N-1)].$$

The second arrival angle estimating unit 30 analyzes the signals outputted from the despreading unit 20 through the use of an auto-correlation matrix, thereby deciding a second arrival angle of peak signals. As shown in FIG. 3, the second arrival angle estimating unit 30 includes a second matrix analyzing unit 31 and a second peak signal detecting unit 32.

The second matrix analyzing unit 31 serves to decide the eigenstructure of an auto-correlation matrix with respect to the output vector x(n) of the despreading unit 20, using equation 14:

$$R_{x(n)}=E[x(n)x^H(n)].$$

The second peak signal detecting unit 32 serves to detect a second arrival angle of peak signals based on the auto-correlation matrix decided by the second matrix analyzing unit 31. In the embodiment of the present invention, if it is assumed that one GPS signal is included in the received signals, the arrival angles including a GPS and an interference are decided on the basis of L+1 largest peaks using equations 5 and 7 supra.

At this time, the subspace of a GPS signal is included in the subspace of signals. Therefore, $\Gamma_{M-L}$ of equation 7 is changed to $\Gamma_{M-L-1}$.

In other words, the GPS signal electric power available after despreading is far higher than the noise power level. Thus, the GPS signal electric power forms its own subspace. The arrival angle of the GPS signal is included in the second arrival angle resting on the output vector of the despreading unit 20.

The arrival angle selecting unit 50 serves to select a different peak value by comparing the first arrival angle and the second arrival angle. More specifically, the arrival angle information estimated prior to despreading includes only the arrival angles of interferences other than the GPS. The arrival angle information estimated after despreading includes the arrival angles of the GPS signals and the interference signals. The arrival angles of the interference signals available before and after despreading are equal to each other. Thus, the arrival angle selecting unit 50 according to the present invention decides the arrival angle value included in the post-despreading arrival angle information but not included in the pre-despreading arrival angle information, as the arrival angle of the GPS signal.

The beam forming unit 60 is connected to the arrival angle selecting unit 50. The beam forming unit 60 serves to remove the interference signal of the selected arrival angle and to process the signals received by the GPS. It is preferred that the beam forming unit 60 is realized by an adaptive-array-based beam former such as an MVDR (Minimum-Variance-Distortionless-Response) or a GSC (Generalized Side-lobe Canceller). This makes it possible to effectively receive the GPS signal.

Next, description will be made on a GPS arrival angle selecting method according to the present invention, which makes use of the GPS arrival angle selecting system described above.

FIG. 4 is a flowchart illustrating the overall flow of the GPS arrival angle selecting method according to the present invention. Upon receiving a GPS signal through a receiving antenna of a GPS receiver (S10), the first arrival angle estimating unit 10 performs a step (S20) of deciding a first arrival angle of peak signals among the signals received prior to despreading.

FIG. 5 is a flowchart illustrating the detailed flow of step S20 in the GPS arrival angle selecting method according to the present invention. The first matrix analyzing unit 11 performs a step (S21) of deciding an eigenstructure of an auto-correlation matrix with respect to the signal received prior to despreading. The first peak signal detecting unit 12 performs a step (S22) of detecting a first arrival angle of peak signals based on the auto-correlation matrix decided in step S21.

In step S20, it is possible to estimate the arrival angles of interferences other than the GPS. The specific technical concepts of steps S21 and S22 are the same as described above in respect of the detailed configuration of the first arrival angle estimating unit 10. Therefore, no duplicate description will be made in that regard.

Apart from step S20, the despreading unit 20 performs a despreading step (S30) of increasing the electric power of the GPS reception signal to the interference power level or more. The specific technical concept of step S30 is the same as described above in respect of the detailed configuration of the despreading unit 20. Therefore, no duplicate description will be made in that regard.

Then, a step (S40) of deciding a second arrival angle of peak signals among the signals received after despreading is performed.

FIG. 6 is a flowchart illustrating the detailed flow of step S40 in the GPS arrival angle selecting method according to the present invention. The second matrix analyzing unit 31 performs a step (S41) of deciding an eigenstructure of an auto-correlation matrix with respect to the signals outputted in step S30. The second peak signal detecting unit 32 performs a step (S42) of detecting a second arrival angle of peak signals based on the auto-correlation matrix decided in step S41.

In step S40, it is possible to estimate the arrival angles of GPS signals and interference signals. The specific technical concepts of steps S41 and S42 are the same as described above in respect of the detailed configuration of the second arrival angle estimating unit 30. Therefore, no duplicate description will be made in that regard.

Next, the arrival angle selecting unit 50 performs a step (S50) of selecting a different peak value among the estimated peak values by comparing the first arrival angle and the second arrival angle (S40).

The arrival angle information estimated prior to despreading includes only the arrival angles of interferences other than the GPS. The arrival angle information estimated after despreading includes the arrival angles of the GPS signals and the interference signals. In steps S40 and S50, the arrival angle value included in the post-despreading arrival angle information but not included in the pre-despreading arrival angle information is selected as the arrival angle of the GPS signal.

Next, description will be made on the tests which were conducted to confirm the performance of the GPS arrival angle selecting system and method described above.

In the tests, eight antenna array elements were used (M=8). Reception signals were divided as in two test examples.

The reception signals of a first test example includes one GPS signal, two CW (Continuous Wave) interference signals, two FM (Frequency-Modulated) interference signals, two WB (Wide Band) noise interference signals and an AWGN (Additive White Gaussian Noise). Parameters of the respective signals are summarized in Table 2 below.

TABLE 2

| Signals | Azimuth Angle (°) | Altitude Angle (°) | Central Frequency |
|---|---|---|---|
| GPS | 81 | 71 | — |
| CW | 52, −41 | 71, 71 | 0.14, 0.24 |
| FM | −71, 38 | 71, 71 | 0.20, 0.45 |
| WB | 10, −12 | 71, 71 | 0.05, 0.35 |

The reception signals of a second test example includes one GPS signal, two CW interference signals, two FM interference signals, one WB noise interference signal, two rectangular-wave interference signals and an AWGN. It is assumed that the rectangular-wave interference signals are on/off period signals of 50 samples and 500 samples. Parameters of the respective signals are summarized in Table 3 below.

TABLE 3

| Signals | Azimuth Angle (°) | Altitude Angle (°) | Central Frequency |
|---|---|---|---|
| GPS | 25 | −82 | — |
| CW | −85 | −82 | 0.41 |
| FM | 54, −42 | −82, −82 | 0.07, 0.19 |
| WB | 87 | −82 | 0.29 |
| Pulsed | 39, −16 | −82 | —, — |

In the test examples, the signal-to-noise ratio of the GPS signal was set equal to −30 dB and the jammer-to-signal ratio of the interference (or jammer) signals was set equal to 60 dB. The modulation index β of the FM interference signals is 0.05. The normalized modulation fm is 0.001. For the sake of convenience, the altitude angles of all the signals are set equal to one another.

FIG. 7 shows a reception signal spectrum in the first test example. It can be noted in FIG. 7 that there are two CW interference signals, two FM interference signals and two WB noise interference signals. At this time, the electric power of the GPS signal is far lower than the interference signal power level. Therefore, the existence of a GPS signal spectrum is not confirmed in FIG. 7.

FIG. 8 shows a music cost function resting on the signal received prior to despreading, which is obtained in the first test example. It can be noted in FIG. 8 that there are six peaks associated with six interference signals.

FIG. 9 shows a music cost function resting on the signal received after despreading, which is obtained in the first test example. It can be noted in FIG. 9 that the music cost function available after despreading includes seven peaks associated with one GPS signal and six interference signals.

In other words, the angle 81° as a peak value not included in FIG. 8 but included in FIG. 9 can be selected as a GPS azimuth angle in the first test example.

FIG. 10 shows a reception signal spectrum in the second test example. It can be noted in FIG. 10 that there are one CW interference signal, two FM interference signals and one WB noise interference signal. At this time, two rectangular-wave interference signals exist over all frequency bands. As in the first test example, the electric power of the GPS signal is far lower than the interference signal power level. Therefore, the existence of a GPS signal spectrum cannot be identified in FIG. 10.

FIG. 11 shows a music cost function resting on the signal received prior to despreading, which is obtained in the second test example. It can be noted in FIG. 11 that there are six peaks associated with six interference signals.

FIG. 12 shows a music cost function resting on the signal received after despreading, which is obtained in the second test example. It can be noted in FIG. 12 that the music cost function available after despreading includes seven peaks associated with one GPS signal and six interference signals.

Accordingly, the angle 25° as a peak value not included in FIG. 11 but included in FIG. 12 can be selected as a GPS azimuth angle in the second test example.

While one preferred embodiment of the present invention has been described above, the present invention is not limited to the aforementioned embodiment. The GPS arrival angle selecting system and method can be realized in many different forms without departing from the spirit and scope of the invention.

What is claimed is:

1. A GPS arrival angle selecting system, comprising:
an arrival angle estimating unit connected to a receiving antenna of a GPS receiver including at least one antenna array element and configured to determine a first arrival angle of a first signal received prior to despreading and a second arrival angle of a second signal received after despreading; and
an arrival angle selecting unit configured to select a different peak value by comparing the first arrival angle and the second arrival angle to determine the GPS arrival angle wherein a beam is formed in the GPS arrival angle direction, wherein the arrival angle estimating unit includes:
a first arrival angle estimating unit connected to the receiving antenna and configured to determine a first arrival angle of peak signals by analyzing the first signal received prior to despreading through the use of an auto-correlation matrix;
a despreading unit connected to the receiving antenna and configured to increase the electric power of a GPS signal to an interference power level or more; and
a second arrival angle estimating unit configured to determine a second arrival angle of peak signals by analyzing the second signal outputted from the despreading unit through the use of an auto-correlation matrix.

2. The system of claim 1, wherein the first arrival angle estimating unit includes:
a first matrix analyzing unit connected to the receiving antenna and configured to determine an eigenstructure of an auto-correlation matrix with respect to the first signal received prior to despreading; and
a first peak signal detecting unit configured to detect the first arrival angle of the peak signals based on the auto-correlation matrix determined by the first matrix analyzing unit.

3. The system of claim 2, wherein the eigenstructure of the auto-correlation matrix is determined by $R_x \Gamma = \Gamma \Lambda$, where Rx denotes the auto-correlation matrix, Λ denotes a diagonal matrix represented by $\Lambda = \text{diag}\{\lambda_2, \ldots, \lambda_M\}$ in which $\{\lambda 1\}$ is an eigenvalue, and Γ denotes a eigenvector matrix, wherein the auto-correlation matrix is defined by $R_x = E[x(k)x^H(k)]$, and wherein a function for estimating the first arrival angle of the signal received prior to despreading is calculated by $$P_M(\theta, \phi) = \frac{1}{a^H(\theta, \phi)\Gamma_{M-L}\Gamma_{M-L}^H a(\theta, \phi)},$$

where $\Gamma_{M-L}$ denotes an Mx(M−L) matrix composed of columns including M−L eigenvectors equivalent to M−L smallest eigenvalues.

4. The system of claim 2, wherein the despreading unit is configured to generate an output based on a PRN code ($C_i$) of an ith satellite composed of an identical C/A code, the output of the despreading unit calculated by $$x(n)=a_c Nb(n)+As(n)+v(n),$$

where b(n)) denotes a GPS data bit, s(n) is represented by $s(n)=S(n)c_i$ in which S(n) is given by $S(n)=[s(k), \ldots, s(k+N-1)]$, and v(n) is represented by $v(n)=V(n)c_i$ in which V(n) is given by $V(n)=[v(k), \ldots, v(k+N-1)]$.

5. The system of claim 4, wherein the second arrival angle estimating unit includes:
- a second matrix analyzing unit configured to determine an eigenstructure of an auto-correlation matrix with respect to the output of the despreading unit; and
- a second peak signal detecting unit configured to detect the second arrival angle of the peak signals based on the auto-correlation matrix determined by the second matrix analyzing unit.

6. The system of claim 1, further comprising:
- an adaptive-array-based beam forming unit connected to the arrival angle selecting unit and configured to remove an interference signal of a selected arrival angle and to process a GPS reception signal.

7. A GPS arrival angle selecting method, comprising the steps of:
- (a) if a GPS receiver including at least one antenna array element receives GPS signals, determining a first arrival angle of peak signals among the GPS signals received prior to despreading through the use of a first arrival angle estimating unit;
- (b) determining a second arrival angle of peak signals among the GPS signals received after despreading through the use of a despreading unit and a second arrival angle estimating unit; and
- (c) selecting a different peak value among estimated peak values through the use of an arrival angle selecting unit by comparing the first arrival angle and the second arrival angle to determine the GPS arrival angle wherein a beam is formed in the GPS arrival angle direction.

8. The method of claim 7, wherein the step (a) includes the steps of:
- (a-1) determining an eigenstructure of an auto-correlation matrix with respect to the GPS signals received prior to despreading through the use of a first matrix analyzing unit; and
- (a-2) detecting the first arrival angle of the peak signals based on the auto-correlation matrix determined in the step (a-1) through the use of a first peak signal detecting unit.

9. The method of claim 8, wherein the step (b) includes the step of:
- (b-1) outputting a signal based on a PRN code ($C_i$) of an ith satellite composed of an identical C/A code.

10. The method of claim 9, wherein the step (b) further includes the steps of:
- (b-2) determining an eigenstructure of an auto-correlation matrix with respect to the signal outputted in the step (b-1) through the use of a second matrix analyzing unit; and
- (b-3) detecting the second arrival angle of the peak signals based on the auto-correlation matrix determined in the step (c-1) through the use of a second peak signal detecting unit.

* * * * *